United States Patent [19]

Bloch

[11] 4,098,161
[45] Jul. 4, 1978

[54] APPARATUS FOR PERFORMING SEQUENTIAL FABRICATING OPERATIONS ON A WORKPIECE

[75] Inventor: Alf Leif Bloch, Pleasant Ridge, Mich.

[73] Assignee: Wes Industries, Inc., Troy, Mich.

[21] Appl. No.: 810,705

[22] Filed: Jun. 28, 1977

[51] Int. Cl.$^2$ .............................................. B26F 1/04
[52] U.S. Cl. ....................................... 83/519; 83/582; 83/615; 83/623; 83/639
[58] Field of Search ................. 83/519, 615, 582, 623, 83/639

[56] References Cited

U.S. PATENT DOCUMENTS

| | | | |
|---|---|---|---|
| 1,357,358 | 11/1920 | Smith | 83/615 X |
| 1,452,224 | 4/1923 | Smith | 83/615 X |
| 3,270,604 | 9/1966 | Waltoneu | 83/140 |
| 3,897,707 | 8/1975 | Kruse et al. | 83/615 X |

*Primary Examiner*—Frank T. Yost

*Attorney, Agent, or Firm*—Cullen, Settle, Sloman & Cantor

[57] ABSTRACT

A method and apparatus are disclosed to perform a pair of fabricating operations in sequence on a single workpiece. The apparatus includes an anvil interposed between a pair of spaced, aligned confronting fabricating tools, such as punches or welders. In the apparatus, power means and a force equalization system are mounted on one side of the anvil, so that one of the fabricating tools is essentially at one end of the apparatus. In the method, a workpiece having two generally parallel sections is placed over the anvil such that each workpiece section is interposed between one face of the anvil and a corresponding tool. Then, each workpiece section is subjected in sequence to a fabricating operation, by first displacing one fabricating tool and the anvil toward each other and then displacing the other fabricating tool and the anvil toward each other. During both fabricating steps, the forces applied to the opposed faces of each workpiece section are essentially equalized in order to minimize workpiece distortion.

12 Claims, 5 Drawing Figures

APPARATUS FOR PERFORMING SEQUENTIAL FABRICATING OPERATIONS ON A WORKPIECE

BACKGROUND OF THE INVENTION

1. Field of the Invention

This invention relates to a method and apparatus for fabricating workpieces of metal or other materials. More specifically, the invention embodies dual work members in alignment with each other and with a movable anvil such that an equalization of forces may be achieved during a two-phase sequential fabricating operation to reduce distortion on separate aligned portions of a workpiece. This invention may be used in welding, riveting, punching, piercing, pressing, stamping, etc., wherever there is an application of force to two essentially aligned sections of a workpiece.

2. The Prior Art

Various prior art patents have disclosed different apparatus for achieving essentially equalized pressure on opposite faces of a workpiece during a fabricating operation. Such patents include U.S. Pat. Nos. 3,270,604, 3,299,247, 3,396,260, 3,008,032, 3,008,034, and 3,136,879, all incorporated by reference. As recognized particularly in U.S. Pat. No. 3,270,604, it is desirable to equalize the force on the workpiece in order to minimize or eliminate workpiece distortion.

For the most part, the prior art has not provided an apparatus or method for achieving a dual fabrication operation on two essentially parallel sections of a workpiece. Only one of the above-enumerated patents U.S. Pat. No. 3,270,604, discloses such an apparatus and method. However, the apparatus disclosed in that patent exhibits certain drawbacks. For example, in the apparatus of U.S. Pat. No. 3,270,604 the hydraulic units are positioned at each end of the unit with the anvil being in essentially the center. While the overall structure has provided significant advances in the art, the general arrangement necessarily can not perform certain desired operations. For example, the smaller vehicles now include parts which can not be fabricated in the prior arrangement; and the prior arrangement could not be utilized with another such apparatus so that the anvils could receive workpieces which require four aligned fabrications. As a result, manual labor has been required to position and then reposition the workpieces, resulting in longer cycle times and greater fabrication expenses.

Accordingly, the prior art has evidenced certain shortcomings and disadvantages, even as related to fabrication operations performed in alignment on parallel sections of a workpiece.

SUMMARY OF THE INVENTION

The present invention overcomes the shortcomings and disadvantages by an apparatus which includes a movable anvil, a pair of opposed alternately movable work members, and a pair of hydraulic power units positioned on the same side of the anvil. In the general operation, one of the work members and the anvil move toward each other to perform a fabrication operation on one section of a workpiece. Then, the other work member and the anvil move toward each other to perform a fabrication operation on another section of the workpiece, essentially in alignment with the first operation. During the sequential fabrication steps, the forces on the opposite sides of each workpiece section are essentially equalize to minimize workpiece distortion.

More particularly, the apparatus includes an anvil mounted for axially reciprocal movement to both sides of a neutral datum planar position during a pair of sequential fabricating operations. A fabricating tool is disposed on each side of the anvil along the axis of anvil movement, with each tool likewise being mounted for axial reciprocating movement. One of the fabricating tools includes a displacement structure which extends across the datum plane to the other side of the apparatus, so that a pair of rigidly interconnected power means may be positioned on that same side of the datum plane. A force equalizing system is also positioned on that same side of the datum plane for the purpose of displacing the anvil toward each respective fabricating tool as each tool in sequence is advanced toward the anvil.

According to the disclosure, the displacement structure for one of the fabricating tools includes a pair of spaced parallel plates extending across the datum plane to the remote end of the apparatus. An end plate secured to the remote ends of these parallel plates forms a box structure within which the anvil is nested.

The anvil may also be secured to a pair of parallel plates which extend generally in a direction toward the power means. A cylinder plate extends across and interconnects the second pair of parallel plates to form a box structure within which the other of the fabricating tools is nested.

Various types of power means may be utilized, but the disclosed embodiment perferentially employs hydraulic pistons and cylinders. Likewise, the force equalization system may include various types of biasing means, but the disclosed embodiment perferentially employs compression springs.

Accordingly, the present invention provides various improvements and advantages over the prior art. For example: (1) two operations can be performed automatically and in alignment on separate sections of a single workpiece; (2) four operations can be performed automatically and in alignment on separate sections of a single workpiece by using two of the apparatus of this invention in adjacent alignment; (3) accurate alignment of the two fabrication operations may be achieved; (4) manual labor is not required to re-position the workpiece during the two or four operations, thereby reducing labor costs and reducing cycle time; (5) the fabrication apparatus is self-equalized during the two operations in order to minimize workpiece distortion; (6) the method of operation may be totally automatable; and (7) the apparatus may be of a compact design, be simplistic in overall arrangement, be of sturdy construction, have a wide range of utility and provide a long service life.

These and other meritorious features and advantages will be more fully appreciated from the following detailed description and the appended claims.

DETAILED DESCRIPTION OF THE PREFERRED EMBODIMENTS

Figure 1:
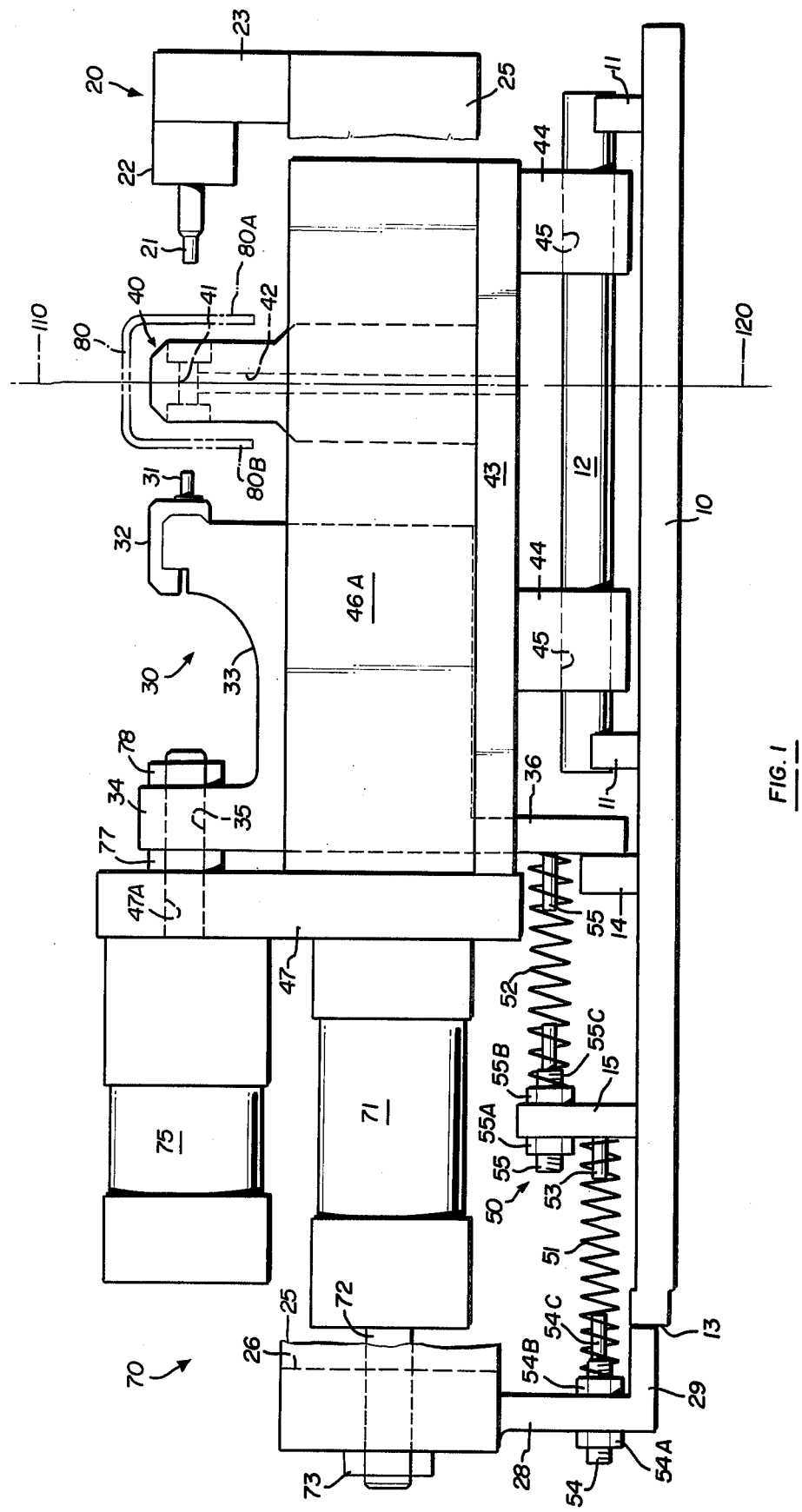
FIG. 1 is a partially fragmentized side elevational view of the apparatus proposed by the present invention.

The present invention relates to a fabricating apparatus for performing sequential operations on two essentially parallel sections of a workpiece 80. Referring to FIG. 1, the apparatus generally includes a fixed base 10, a first fabricating tool 20 and its associated displacement structure, a second fabricating tool 30 and its associated displacement structure, a movable anvil 40 interposed between and in alignment with the two fabricating tools, a force equalizing system 50, and power means 70 for displacing each respective fabricating tool. During operation of the disclosed apparatus, all of the components move except the stationary base 10 and its associated rigid components. The present invention may be utilized in any operation where force is to be applied to a pair of workpiece sections, such as in welding, riveting, punching etc. For exemplary purposes, the disclosed embodiment includes a punching apparatus.

The fixed base 10 is generally comprised of an elongated horizontal plate. Four mounting brackets 11 (only two of which are illustrated in the drawings) are rigidly secured to the base 10. Respective pairs of these mounting brackets 11 receive and are rigidly connected by appropriate means to a pair of parallel cylindrical guide rods 12 (only one of which is shown in the drawings). These guide rods support the movable structure of this apparatus as more fully disclosed below.

The left end of the base 10, as viewed in FIG. 1, provides a stop 13 against which a part of the displacement structure for fabricating tool 20 abuts when the overall assembly is in a normal, non-operational, balanced position. An upwardly extending tab 14 serves as a second stop against which a portion of the second fabricating tool 30 abuts, likewise when the overall apparatus is in a normal, non-operational, balanced position. A second upwardly extending tab 15 serves as an abutment for various components of the force equalizing system 50. The various functions of these stops and abutments will be more fully explained in reference to the other components of the apparatus.

Figure 2:
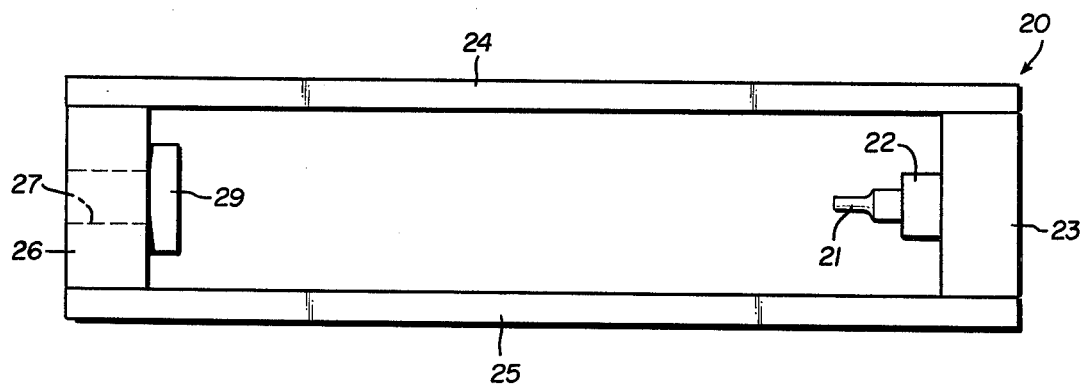
FIG. 2 is a top plan view of one of the fabricating tools and the box-like displacement structure to which it is rigidly connected.

Referring to FIGS. 1 and 2, the first fabricating tool 20 includes a punch 21 conventionally secured in a carrier 22 which is mounted to an end plate 23. A displacement structure for punch 21 includes a pair of generally parallel side plates 24 and 25 which extend from end plate 23 to the remote end of the apparatus where they are connected by a second end plate 26. This second end plate includes a generally cylindrical opening 27 to receive a piston rod, as more fully disclosed later, with a flange 28 depending downwardly from the end plate and terminating in a generally horizontal abutment 29 which is biased against stop 13. This overall general arrangement forms a first box-like structure which encloses the anvil 40, a portion of the second fabricating tool 30 and a portion of the power means 70.

Figure 3:
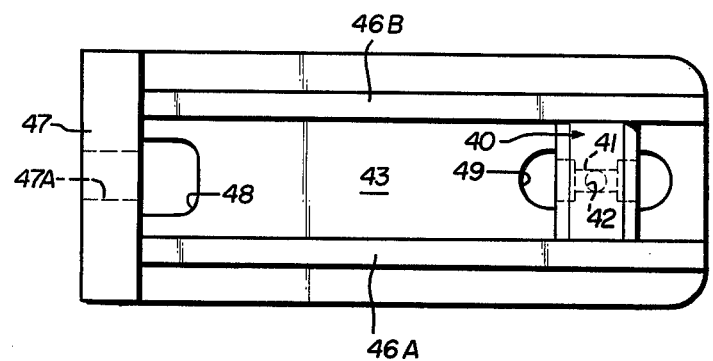
FIG. 3 is a top plan view of the anvil and a similar box-like displacement structure to which it is rigidly connected.

Referring to FIGS. 1 and 3, the anvil structure 40 includes a primary structure in alignment with the punch 21 and includes a generally horizontal cylindrical opening 41 and a generally vertical opening 42 to accommodate punched slugs formed during the fabricating operation. The anvil structure is rigidly connected to a slide base 43 to which four separate mounting brackets 44 are connected. These mounting brackets include cylindrical openings 45 which receive the guide rods 12 to accommodate reciprocal displacement of the anvil structure during the sequential fabrication operations. A second pair of vertical, generally parallel plates 46A and 46B are rigidly secured to both the anvil 40 and the slide base 43 and extend from the anvil toward the power means 70. These second parallel plates 46A and 46B terminate in ends to which a cylinder plate 47 is rigidly secured. As shown in FIG. 3, the slidable base plate 43 includes a notched region 48 to receive a portion of the fabrication tool 30, as more fully explained below. Additionally, an opening 49 is provided in the slidable base 43 to accommodate the ejection of slugs from the internal opening 42 in the anvil.

As shown in FIG. 1, the cyclinder plate 47 is vertically arranged and extends upwardly above the tops of the parallel plates 46A and 46B. A first hydraulic cylinder 71 is rigidly secured to the backside of the cylinder plate 47 such that a piston rod 72 extends out of the cylinder toward the end plate 26, to which the piston rod is secured by suitable conventional securement means such as the illustrated nut 73 which is received on threads of the piston rod.

A second hydraulic cylinder 75 is also rigidly connected to the cylinder plate 47 in general alignment with the anvil 40 and punch tool 21. A piston rod 76 freely extends through a generally cylindrical opening 47A in the cylinder plate 47 and is secured to the second fabricating tool 30 by nuts 77 and 78.

The second fabricating tool 30 likewise includes a punch 31 which is suitably and conventionally secured within a punch sub-assembly 32. This sub-assembly is likewise suitably secured to a slide ram structure 33 which is nested within the parallel side plates 46A and 46B of the anvil structure. An upwardly projecting portion 34 of the slide ram 33 includes a cylindrical opening 35 which receives the piston rod 76; and a downwardly projecting tab 36 of the slide ram structure 33 is received through recess 48 in the slide base 43 of the anvil structure. This depending tab 36 is maintained in abutment against stop 14 by the force equalizing system 50 when the apparatus components are positioned as illustrated in FIG. 1.

The force equalizing system 50 includes, primarily, a pair of oppositedly acting compression springs 51 and 52. The first compression spring 51 is interposed between stop 15 and the displacement structure of fabricating tool 20, whereas the second compression spring 52 is interposed between stop 15 and depending tab 36 of fabricating tool 30. A rod 53 is rigidly secured to stop 15 to receive and maintain the right hand end of compression spring 51 in place. A threaded rod 54 extends through a threaded opening in depending portion 28 of end plate 26 and is retained in place by a pair of nuts 54A and 54B. An extension 54C on rod 54 receives the left hand end of compression spring 51 for maintaining that portion of the spring in place.

In a similar manner, a rod 55 is rigidly secured to depending tab 36 for receiving the right hand end of compression spring 52 to maintain that portion of the spring in position. A threaded rod 55 extends through a threaded opening in stop 15 and is retained in position by nuts 55A and 55B. An extension 55C on rod 55 receives and retains the left hand end of compression spring 52 in place.

As will be appreciated, threaded rods 54 and 55 may be adjusted to vary the amount of compression in springs 51 and 52 to achieve essentially equalized biasing forces. This overall force equalizing system establishes oppositely directed forces on the fabricating tools 20 and 30. More particularly, compression spring 52 exerts a force on slide ram structure 33 toward the anvil, i.e. in a right hand direction as illustrated in FIG. 1. In a similar manner, compression spring 51 exerts a leftwardly directed force, as illustrated in FIG. 1, causing fabricating tool 20 to also be biased toward the anvil.

Figure 4:
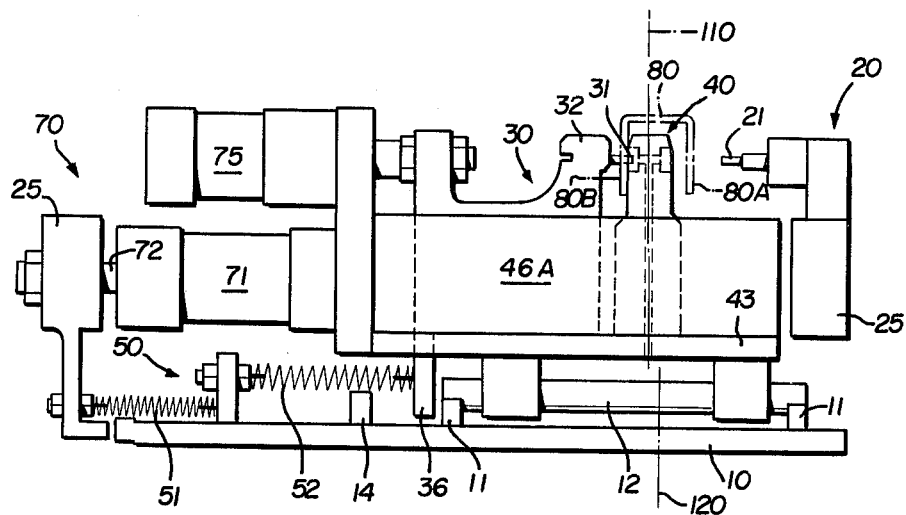
FIGS. 4 and 5 are partially fragmentized side elevational views similar to FIG. 1, illustrating the movement of the various components of this apparatus during the sequential fabrication operations.
Figure 5:
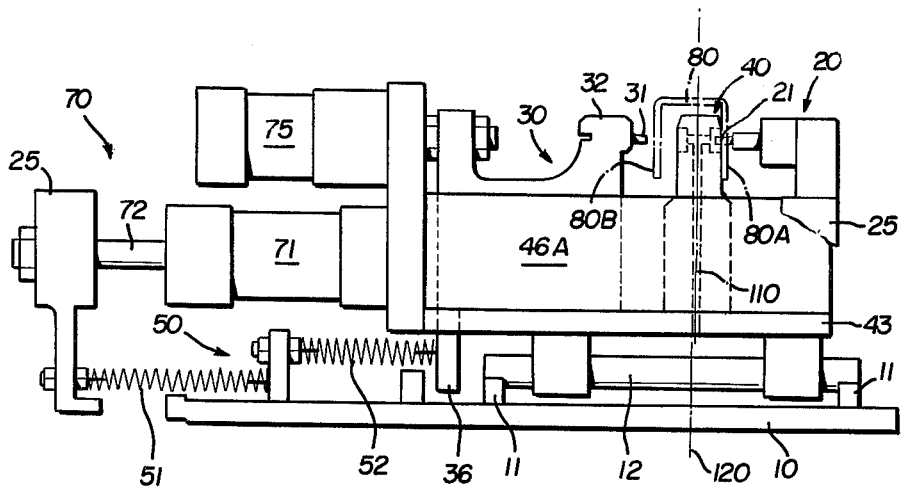

Referring now more particularly to FIGS. 4 and 5, the sequential fabricating steps are initiated by positioning an inverted, generally U-shaped workpiece 80 over the anvil 40, such that depending legs 80A and 80B of the workpiece are interposed between opposite sides of the anvil and respective fabricating tools 20 and 30. As illustrated in FIG. 1, the center line 110 of the anvil coincides with a reference plane 120 of the base when the anvil in a neutral position prior to the initiation of the punching cycle. Then, hydraulic cylinder 75 is activated by a conventional power source (not shown) so that piston rod 76 is displaced out of the cylinder, causing slide ram structure 33 and the punching tool 31 to be displaced toward the anvil. As the slide ram structure 33 and the depending tab 36 are displaced, the amount of compression in spring 52 is reduced. At the same time, there is no relative movement between the slide ram structure of tool 20. Therefore, an unbalanced force in the equalizing system 50 is achieved and compression spring 51 responds by displacing fabricating tool 20 leftwardly. Because the cylinder 71 associated with fabricating tool 20 is secured to the cylinder plate 47 to which the anvil is likewise secured, the anvil is displaced toward the advancing punch tool 31 and toward leg 80B of the workpiece in order to equalize the forces about that workpiece leg. As a result, an essentially equalized application of force is applied to the workpiece during the punching operation, thereby minimizing distortion.

As shown in FIG. 4, during this phase of the operation the anvil 40 moves toward punch 30, such that the anvil center line 110 is slightly to the left of the fixed reference plane 120.

Once the punch 31 has reached the position shown in FIG. 4, piston rod 76 is retracted to displace the slide ram structure away from the anvil until depending tab 36 engages stop 14. During this retracted movement, the compression in spring 52 is increased. To equalize the forces between springs 51 and 52, the fabricating tool 20 and associated structure are automatically displaced by the overall force equalizing arrangement to compress spring 51 until abutment 29 engages stop 13. By this movement, the anvil 40 returns to its neutral postion so that the anvil center line 110 once again coincides with the fixed reference plane 120.

Referring to FIG. 5, the next phase of the operation occurs when cylinder 71 is activated by an appropriate source (not shown). As illustrated, piston rod 72 is advanced to the left, correspondingly displacing end plate 26, parallel plates 24 and 25, and punch 21. This leftward movement of punch tool structure 20 reduces the compression in spring 51 and disturbs the pressure balance between springs 51 and 52. In response to that imbalance, compression spring 52 forces ram slide structure 33 to the right. This movement carries cylinder 75 and cylinder plate 47 to the right, resulting in the displacement of anvil 40 toward the advancing punch 21 and toward leg 80A of the workpiece in order to equalize the forces about the workpiece leg.

As shown in FIG. 5, during this phase of the operation the anvil 40 moves toward punch 30, such that the anvil center line 110 is slightly to the right of fixed reference plane 120.

After tool 21 has punched an opening in workpiece 80 and has reached the position shown in FIG. 5, piston rod 72 is retracted to displace the fabricating tool structure 20 away from the anvil. As a result, the compression in spring 51 is increased, setting up an imbalance in the forces within the overall equalization system 50 between the springs 51 and 52. Thus, slide ram structure 33 is displaced to the left until depending tab 36 engages stop 14, thereby achieving an equalization of forces between the springs 51 and 52. The leftward displacement of slide ram structure 33 likewise effects corresponding displacement of the anvil, by virtue of the interconnection with cylinder 75 and cylinder plate 47. By this movement, the anvil returns to its neutral position so that the anvil center line 110 again coincides with the reference plane 120.

As will be appreciated, various modifications and additions can be made to the disclosed structure without departing from the inventive nature thereof. For example, alternative power means may be used in lieu of the hydraulic cylinders. Likewise, alternative biasing means may be utilized in lieu of the compression springs. Positive stops may also be provided to limit the movement of either or both slide rams 20 and 30 and the anvil in either direction. Punches may also be provided on the anvil, with punch inserts being provided on the slide rams. In short, the foregoing disclosure has been exemplary in nature rather than limiting, the invention being limited only the following appended claims.

Having therefore completely and sufficiently disclosed my invention, I now claim:

1. An apparatus for performing sequential fabricating operations on a workpiece, comprising:
   an anvil mounted for axially reciprocal movement to both sides of a neutral datum planar during a pair of sequential fabricating operation;
   a fabricating tool disposed on each side of the anvil along the axis of anvil movement, each tool being mounted for axial reciprocating movement (a) toward the anvil during one phase of the fabricating operation and (b) with the anvil toward the other tool during another phase of the fabricating operation, a first of said tools being on one side of the datum plane and the second of said tools being on the other side of the datum plane, said second tool being rigidly interconnected with a displacement structure which extends from said second tool across the datum plane to said one side thereof;
   a pair of power means rigidly interconnected on said one side of the datum plane and rigidly interconnected with said anvil, one of the power means including a displacement member interconnected to said first tool and the second of the power means including a displacement member interconnected with a portion of said displacement structure on said one side of the datum plane; and
   a force equalizing system interconnected with each of the fabricating tools (a) for displacing the anvil and said second tool toward the first tool as said first tool is displaced toward the anvil by said one power means and (b) for displacing the anvil and said first tool toward the second tool as said second tool is displaced toward the anvil by said second power means.

2. The apparatus as defined in claim 1, wherein the power means include a pair of hydraulic cylinders and wherein said displacement members consist of piston rods.

3. The apparatus as defined in claim 1, wherein the force equalizing system includes a pair of oppositely acting biasing members arranged on the same side of the datum plane as the power means, one of the biasing members being interposed between a fixed stop and said first tool and the second of said biasing members being interposed between a fixed stop and said displacement structure, such that upon displacement of said first tool the first biasing member is relaxed and the second biasing member reacts to that relaxation to displace the displacement structure and the anvil in a direction opposite to that of the first tool movement so that the anvil and first tool essentially equalize the forces on a workpiece therebetween, and such that upon displacement of said second tool the second biasing member is relaxed and the first biasing member reacts to that relaxation to displace the first tool and the anvil in a direction opposite that of the second tool movement, so that the anvil and second tool essentially equalize the forces on a workpiece therebetween.

4. The apparatus as defined in claim 3, wherein the biasing members include compression springs.

5. The apparatus as defined in claim 3, wherein the fabricating tools are punches and the anvil includes opposed openings to receive the punches.

6. The apparatus as defined in claim 3, wherein the first and second power means include respective hydraulic cylinders which are arranged in vertical alignment and which are rigidly interconnected to a vertical cylinder plate that is likewise rigidly interconnected with the anvil.

7. The apparatus as defined in claim 6, wherein the displacement structure includes a pair of spaced parallel plates extending from said second tool across the datum plane to the distal end of the apparatus, said plates being disposed on each side of the anvil and one of the cylinders, the piston rod of said one cylinder extending in a direction away from the anvil and being rigidly interconnected to an end plate which is interconnected across the ends of the pair of parallel plates.

8. The apparatus as defined in claim 7, wherein the other cylinder is in axial horizontal alignment with the first and second tools, said one cylinder being beneath the first cylinder and being arranged between said parallel plates.

9. The apparatus as defined in claim 8, wherein a piston rod extends outwardly from said other cylinder toward the anvil for interconnection with said first tool.

10. The apparatus as defined in claim 9, further including a stationary base which includes a pair of stationary parallel guide rods; and a slidable support member rigidly interconnected to the anvil, the slidable support member including followers which are mounted on the guide rods.

11. In a dual fabricating apparatus which includes a pair of axially aligned confronting work members mounted for reciprocal movement along the axis of alignment, an intermediate work member interposed between the two confronting work members and mounted for reciprocal movement along the axis of alignment, the intermediate work member being normally positioned on a reference plane but displacable therefrom during the advancement of one of the confronting members, a first of said confronting work members being on a first side of the reference plane and a second of said confronting work members being on a second side of a reference plane, respective power means for displacing each confronting work member, and a force equalization system interconnected between each respective confronting member and a stationary base, the improvement of:
   a displacement structure rigidly interconnected with said first confronting work member and extending across the reference plane to said second side;
   both of said power means being mounted on said second side of the reference plane, a first of said power means being interconnected with said displacement structure for dislacing the first confronting work member, a second of said power means being interconnected with the second confronting work member, and said first and second power means being rigidly interconnected; and
   said force equalization system being located on said second side and including a pair of biasing members, a first of said biasing members being interconnected with and exerting a force on the displacement structure in a direction away from the reference plane to bias the first confronting work member toward the plane and the second of said biasing members being interconnected with and exerting a force on said second confronting work member in a direction toward the reference plane.

12. A fabricating apparatus comprising:
   an anvil mounted for reciprocal axial movement to either side of a reference plane on which the anvil is normally positioned;
   a first pair of essentially parallel plates rigidly interconnected with the anvil and being mounted essentially parallel to the axis of anvil movement and perpendicular to the reference plane;
   a cylinder plate rigidly connected to corresponding ends of the first pair of plates in a position essentially parallel to the reference plane and on a first side of the reference plane;
   a first fabricating tool in alignment with said anvil and being rigidly interconnected with a first slide ram structure which is nested between the first pair of plates and said cylinder plate, the first tool and the first slide ram structure being on said first side of the reference plane;
   a first power means rigidly connected to said cylinder plate and including a displacement member interconnected with said first slide ram structure;
   a second fabricating tool in alignment with said anvil on the second side of the reference plane and being rigidly interconnected with a second slide ram structure, said second slide ram structure including a second pair of essentially parallel plates mounted essentially parallel with said first pair of plates such that at least a portion of the anvil, the first pair of plates and the cylinder plate are nested within the second pair of plates, said second pair of plates extending past the cylinder plate and being interconnected at their remote ends on the first side of the reference plane by an end plate;
   a second power means rigidly connected to said cylinder plate and including a displacement member interconnected with said second slide ram structure;
   a force equalizing system mounted on the first side of the reference plane and including a pair of oppositedly reacting biasing members, a first of said biasing members being interposed between a fixed abutment and the first slide ram to urge the first tool toward the anvil and a second of said biasing members being interposed between a fixed abutment and the second slide ram to urge the second tool toward the anvil.

* * * * *